J. W. TILTON.
SHOCK ABSORBING HUB FOR VEHICLE WHEELS.
APPLICATION FILED MAY 1, 1912.
1,041,702.
Patented Oct. 15, 1912.
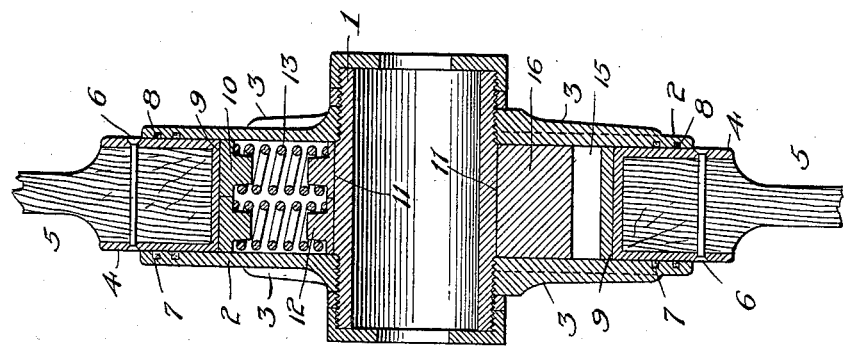
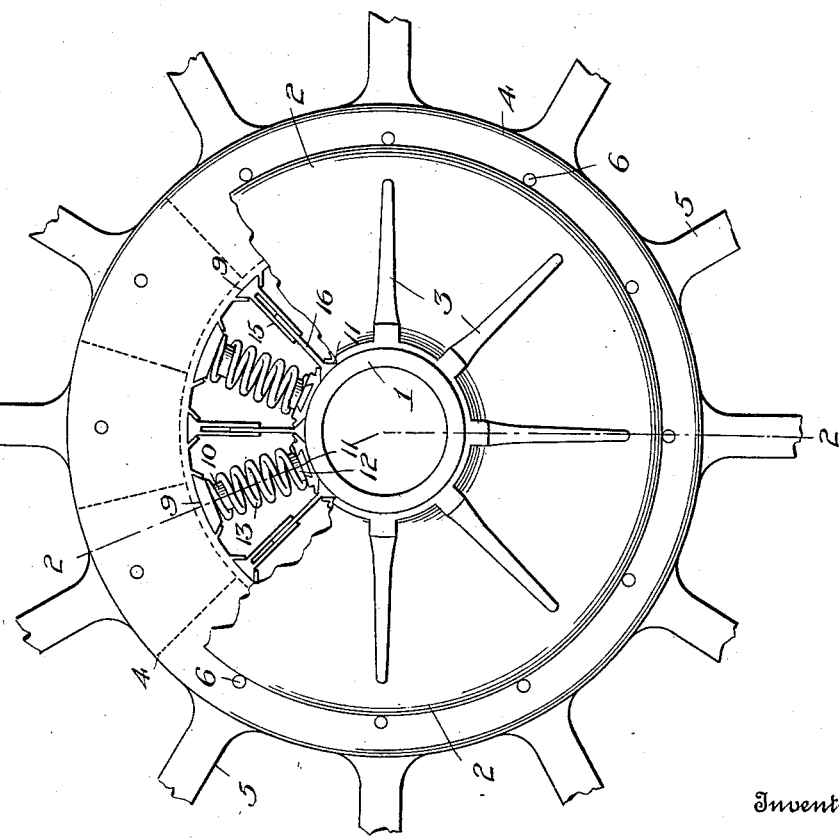
Witnesses
Edwin L Bradford
Frank G Brereton
Inventor
John Walker Tilton
By J. R. Nottingham
Attorney

UNITED STATES PATENT OFFICE.

JOHN WALKER TILTON, OF ATLANTIC CITY, NEW JERSEY, ASSIGNOR OF ONE-HALF TO GEORGE HOEFER, CLEMENT J. ADAMS, AND NICHOLAS W. YOUNG, ALL OF ATLANTIC CITY, NEW JERSEY.

SHOCK-ABSORBING HUB FOR VEHICLE-WHEELS.

1,041,702.   Specification of Letters Patent.   Patented Oct. 15, 1912.

Application filed May 1, 1912. Serial No. 694,554.

*To all whom it may concern:*

Be it known that I, JOHN WALKER TILTON, a citizen of the United States, residing at Atlantic City, in the county of Atlantic and State of New Jersey, have invented certain new and useful Improvements in Shock-Absorbing Hubs for Vehicle-Wheels; and I do hereby declare the following to be a full, clear, and exact description of the invention, such as will enable others skilled in the art to which it appertains to make and use the same.

My invention relates to vehicle wheels of the shock-absorbing type, and has particular reference to certain novel features in the construction of the hub, wherein suitable cushioning-devices, preferably spiral springs, are interposed between the hub proper and the outer rim or spoke-section thereof.

The chief object of the invention is to simplify and cheapen the cost of production of this type of wheel, without in the least impairing its efficiency in operation.

Other objects of the invention will become apparent upon a complete disclosure thereof, such, for instance, as providing a strong and durable wheel, unlikely to become weakened in any of its parts, or unable to successfully absorb any shock to which it may be subjected.

In the drawings, Figure 1 is a side elevation of my improved wheel, one of the side plates being partly broken away to show the arrangement of the cushioning and driving devices, and Fig. 2 is a section on line 2, 2 of Fig. 1.

Referring to the several views, the numeral 1 indicates the hub proper, the ends of which are exteriorly screw-threaded to receive the circular side-plates 2, 2. The side-plates are reinforced at intervals by webs 3, which extend radially from the hub 1 to within a short distance of the outer circumference of said plates. Operative between the side-plates is an annular rim 4 in which the butt ends of the spokes 5 are received and fastened by bolts 6, and in order to provide for suitable lubricating material the inner faces of the plates 2 are furnished with grooves 7, 7 in which felt rings 8 are seated to confine the lubricant and prevent noise or rattle, and to reduce friction. The inner periphery of the annular rim is provided with transverse slots 9, preferably dove-tail shape, to receive dove-tail heads of stud-pins 10, and the outer periphery of the hub proper is provided with similarly shaped slots 11, to receive the dove-tail heads of stud-pins 12. Fitted between the stud-pins 10 and 12 are spiral springs 13, they being preferably arranged in pairs, as shown in Fig. 2.

Arranged between each set of springs is a spring-driver 14, each driver consisting, preferably, of a double leaf member 15 having its head seated in a dove-tail slot 9, the leaves of the member being slightly separated to receive a single leaf member 16 having its head seated in a dove-tail slot 11, the space between the respective stud-pins, and that between the outer end of the single leaf spring and the crotch of the double leaf spring being amply sufficient to permit of the relative movement between the hub-proper and the spoke-section rim. Each spring-driver is substantially the full width of the space between the annular plates 2, as shown in Fig. 2, and serve to prevent torsional strain to the cushioning-springs, and to assist in the initial starting of the wheel.

Dust and dirt are excluded from the cushioning-springs by the annular side-plates, which are readily removable when it is desired to inspect the springs, or renew the same in case of breakage.

The invention is especially applicable to automobile wheels, taking the place of the costly pneumatic tire which is liable to puncture and cause troublesome delays arising therefrom, besides reducing running expenses.

It will be obvious that the spring-drivers may consist of one or more leaves as desired.

Having thus described my invention, what I claim is:

A shock-absorbing hub, comprising a central hub having its outer ends screw-threaded, side-plates screwed on said ends, an annular spoke-holding rim operative within the space-formed between the side-plates, a plurality of pairs of cushioning-devices arranged between said rim and the central hub, and a leaf spring driver arranged between each pair of cushioning devices.

In testimony whereof I affix my signature, in the presence of two witnesses.

JOHN WALKER TILTON.

Witnesses:
CLEMENT J. ADAMS,
HELENE M. STUTZBACH.

---

Copies of this patent may be obtained for five cents each, by addressing the "Commissioner of Patents, Washington, D. C."